(12) United States Patent
Katsev

(10) Patent No.: US 9,819,763 B2
(45) Date of Patent: Nov. 14, 2017

(54) CACHE MANAGEMENT BASED ON FACTORS RELATING TO REPLACEMENT COST OF DATA

(71) Applicant: Fortinet, Inc., Sunnyvale, CA (US)

(72) Inventor: Sergey Katsev, Pleasant Valley, NY (US)

(73) Assignee: Fortinet, Inc., Sunnyvale, CA (US)

( * ) Notice: Subject to any disclaimer, the term of this patent is extended or adjusted under 35 U.S.C. 154(b) by 144 days.

(21) Appl. No.: 14/821,479

(22) Filed: Aug. 7, 2015

(65) Prior Publication Data

US 2017/0041428 A1    Feb. 9, 2017

(51) Int. Cl.
*G06F 15/167* (2006.01)
*H04L 29/08* (2006.01)
*G06F 12/0813* (2016.01)
*G06F 12/126* (2016.01)

(52) U.S. Cl.
CPC ...... *H04L 67/2852* (2013.01); *G06F 12/0813* (2013.01); *G06F 12/126* (2013.01); *H04L 67/02* (2013.01); *G06F 2212/1024* (2013.01); *G06F 2212/154* (2013.01)

(58) Field of Classification Search
None
See application file for complete search history.

(56) References Cited

U.S. PATENT DOCUMENTS

| | | | |
|---|---|---|---|
| 6,425,057 B1 * | 7/2002 | Cherkasova | G06F 12/121 709/219 |
| 6,741,963 B1 * | 5/2004 | Badt | G10L 15/22 704/246 |
| 7,107,321 B1 * | 9/2006 | Shaffer | G06F 12/0888 709/213 |
| 9,317,435 B1 * | 4/2016 | Bairavasundaram | G06F 12/0848 |
| 2002/0099807 A1 * | 7/2002 | Doyle | G06F 17/30902 709/223 |
| 2013/0073809 A1 * | 3/2013 | Antani | G06F 12/121 711/136 |
| 2016/0105345 A1 * | 4/2016 | Kim | H04L 43/08 709/224 |

* cited by examiner

*Primary Examiner* — Joshua Joo
(74) *Attorney, Agent, or Firm* — Hamilton, DeSanctis & Cha LLP

(57) ABSTRACT

Systems and methods for a cache replacement policy that takes into consideration factors relating to the replacement cost of currently cached data and/or the replacement cost of requested data. According to one embodiment, a request for data is received by a network device. A cache management system running on the network device estimates, for each of multiple cache entries of a cache managed by the cache management system, a computational cost of reproducing data cached within each of the cache entries by respective origin storage devices from which the respective cached data originated. The cache management system estimates a communication latency between the cache and the respective origin storage devices. The cache management system enables the cache to replace data cached within a selected cache entry with the requested data based on the estimated computational costs and the estimated communication latencies.

18 Claims, 17 Drawing Sheets

CACHE MANAGEMENT BASED ON FACTORS RELATING TO REPLACEMENT COST OF DATA

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright® 2015, Fortinet, Inc.

BACKGROUND

Field

Embodiments of the present invention generally relate to cache management. In particular, embodiments of the present invention relate to a cache replacement policy that takes into consideration one or more factors relating to replacement cost of the data currently residing in the cache, including, but not limited to, the latency between the cache and the origin server, the processing time for the origin server to produce the data and the amount of time for the cache to create a cache entry and store the data.

The factors of the replacement cost may involve the data being currently returned (and under consideration for storage in the cache), data which already resides in the cache and is a candidate for replacement, or other data which exists in the cache and is not a candidate for replacement, but may influence the decision nonetheless.

Description of the Related Art

Cache memory plays an important role in performance of any computing/client device and/or network system. In a typical computing device, a cache memory is implemented to interface between processing units and the main memory (e.g., Random Access Memory (RAM)) to achieve faster access to data stored in the main memory. Similarly, in a network system/architecture, a computer network device, such as an Application Delivery Controller (ADC), that implements a Hypertext Transfer Protocol (HTTP) cache, can act as an interface between client devices that request static content that resides on one or more web servers. The HTTP cache stores previously requested static content so that a subsequent request for such content by the same or a different client can be served faster. In a network system environment, responsive to receiving a request for data from a client device, the network device first checks the cache system to determine whether the requested data is locally available within the cache memory. If the requested data is found within the cache memory (commonly referred to as cache hit), the client request can be serviced by the network device without contacting the origin server. Alternatively, if the requested data is not available in the cache (commonly referred to as a cache miss), the network device retrieves the data from the server and potentially also caches it locally. As there may be several clients requesting different data, an HTTP cache generally runs full, and hence needs to evict data associated with one or more cache entries to incorporate the newly requested data.

Various caching algorithms/policies, also referred to as replacement algorithms/policies, have evolved over time to determine which of the existing cached data should be retained and/or replaced with new data when the cache is full. Performance of a cache system is typically measured based on the hit rate of the cache, wherein the hit rate describes how often requested data is found in the cache. Another performance parameter for cache system is latency of the cache that describes how long after requesting desired data, the cache returns the data. Existing caching replacement policies reflect various tradeoffs between hit rate and latency.

Examples of existing caching algorithms include Belady's algorithm, Least Recent Used (LRU), Most Recent Used (MRU), Pseudo-LRU, Random Replacement, Segmented LRU, Least Frequent Used (LFU), and largest data item algorithm. When a request for data that is not available in a full cache is received, the data associated with a cache entry selected by one of these algorithms is replaced. For example, when a request for data that is not in the cache is received, the largest existing item can be selected for replacement. Alternatively, cached data that is least frequently used, oldest or most recently used (MRU) can be replaced.

All of these conventional caching algorithms maintain coherence at the granularity of a cache entry. However, as cache sizes have become larger, the efficacy of these caching algorithms has decreased. Inefficiencies have been created by storing large amounts of data, and by replacement of cached data that may take a long time to retrieve from a server.

Therefore, there is a need for systems and methods that provide cache performance improvements.

SUMMARY

Systems and methods are described for a cache replacement policy that takes into consideration, among other parameters, factors relating to the replacement cost of currently cached data and/or the replacement cost of requested data. According to one embodiment, a method is provided for replacing cached data with data requested by a client device. A request for data is received by a network device. A cache management system running on the network device estimates, for each of multiple cache entries of a cache managed by the cache management system, a computational cost of reproducing data cached within each of the cache entries by respective origin storage devices from which the respective cached data originated. The cache management system estimates a communication latency between the cache and the respective origin stoge devices. The cache management system enables the cache to replace data cached within a selected cache entry with the requested data based on the estimated computational costs and the estimated communication latencies.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
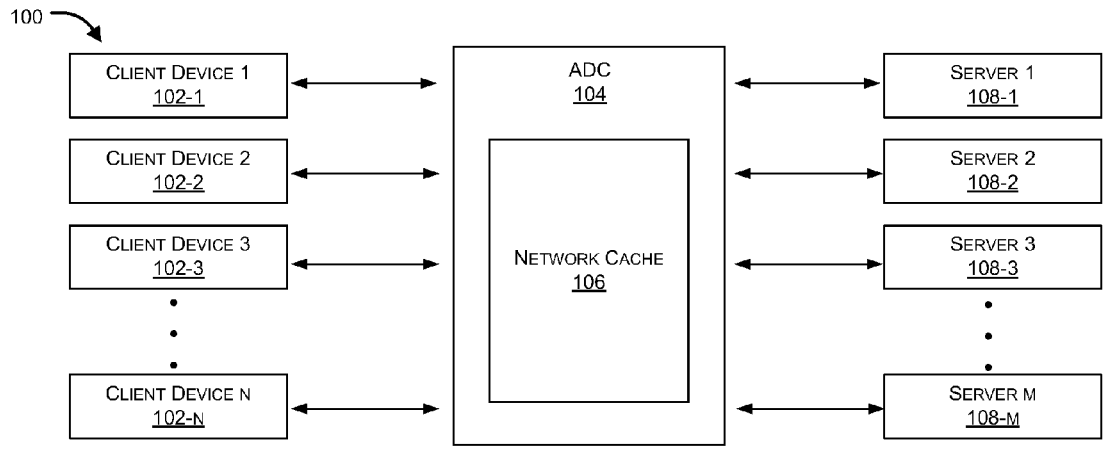
FIGS. 1A to 1D illustrate exemplary architectures showing existing configurations of a network and/or a standalone cache.

Systems and methods are described for a cache replacement policy that takes into consideration factors relating to the replacement cost of currently cached data. In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described in the context of caching data within a cache of an ADC, it should be appreciated that the same has been done merely to illustrate the disclosure in an exemplary manner and other caching applications are within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named/exemplified element/component.

Systems and methods are described for a cache replacement policy that takes into consideration, among other parameters, factors relating to the replacement cost of currently cached data and/or replacement cost of requested data.

In an aspect, the present disclosure relates to a system comprising a cache having multiple cache entries, one or more processors, and a memory containing therein a data block request receive module that is configured to receive a request, from a client device, for data. The memory may further contain a replacement cost module that is configured to estimate, for one or more of multiple cache entries, a computational cost of reproducing data cached within each of the cache entries by respective origin storage devices from which the respective cached data originated, and further configured to estimate communication latency between the cache and the respective origin storage devices. The memory may further include a replacement module that is configured to enable the cache to replace data cached within a particular cache entry (cache line) with the requested data based on estimated replacement costs. According to one embodiment, the cached data to be replaced is that which has the lowest replacement cost relative to the data cached in the other cache entries.

In an aspect, the computational cost and communication latency estimation module can further be configured to estimate a time that the cache takes to recreate a new cache entry for each of the one or more cache entries, and the replacement module can further be configured to take this factor into consideration alone or in combination with one or more other factors associated with replacement cost.

In an aspect, the cache can be any or a combination of a network cache, an Application Delivery Controller (ADC) cache, and a standalone cache. In another aspect, the cache can be a network cache, wherein at least one of the origin storage devices is a server that stores and originates respective cached data.

In an aspect, the replacement module can be configured to cache requested data based on any or a combination of the size of the data, a least frequently used cache entry, the relative size of data cached within each cache entry, the number of times currently cached data has been previously cached, and the sequence of caching of the cached data. In another aspect, values of computational cost and communication latency are considered during replacement only when the size of the cached data to be replaced is greater than a defined threshold. According to an exemplary implementation, values of computational cost and communication latency can be computed by the system by probing the origin storage devices from which the respective cached data originated. According to an embodiment, one or more caches can be synched with each other to update computational cost and communication latency of data cached within each of multiple cache entries.

In another aspect, the present disclosure relates to a method including the steps of receiving, from a client device, a request for data; estimating, by the client device, for one or more of multiple cache entries of a cache, a computational cost of reproducing data cached therein by respective origin storage devices from which the respective cached data originated; and estimating communication latency between the cache and the respective origin storage devices. The method can further include the step of enabling the cache to replace data currently cached within a particular cache entry with the requested data when the replacement cost (e.g., the aggregate of various factors including, but not limited to, the estimated computational cost and the estimated communication latency) of the requested data exceeds that of the data currently cached.

In yet another aspect, the present disclosure relates to a method having the steps of receiving, from a client device, a request for multiple data items; estimating, at the client device, a computational cost of reproducing each of the multiple requested data items by respective origin storage devices from which the respective data items originated; and estimating, at the client device, communication latency between cache and the respective origin storage devices. The method can further include the step of selecting, at the client device, at least one of the requested data items to be placed into the cache based on the estimated computational cost and the estimated communication latency for each of the requested data items.

In an aspect, estimated computational cost and/or estimated communication latency for the selected data item to be cached is greater than that of the computational cost and/or communication latency values for data currently cached. In this manner, it is recognized that it is more efficient to replace cache entries storing data having a computational cost and/or an estimated communication latency that is lower than a defined threshold as such data can be relatively easily accessed from the origin storage device. In yet another aspect, the selected data item to be cached may be selected by taking into consideration the number of storage devices that store the selected data item.

FIGS. 1A-D illustrate exemplary architectures showing existing configurations of a network and/or a standalone cache in which aspects of the present disclosure can be implemented. Notably, while components of the high-level architectures depicted in FIGS. 1A-D are representative of existing architectures, the cache management functionality is vastly different from and provides improvements over that currently employed as will be described in further detail below.

FIG. 1A illustrates an exemplary network cache 106 that can be configured in an Application Delivery Controller (ADC) 104. As shown, in a typical network scenario, ADC 104 can provide an interface between multiple client devices 102 such as client device 102-1, client device 102-2, . . . , client device 102-N, which may be collectively and interchangeably referred to as client devices 102 hereinafter, and servers 108 such as server 108-1, server 108-2, . . . , and server 108-M. During operation, when a client device 102 requests data from a server 108 such as from a content delivery network (CDN), network cache 106 that is configured in the ADC 104 and deployed (e.g., logically or physically interposed) between the client device 102 and the server 108, checks whether the requested data is present within one or multiple cache entries (not shown) of network cache 106, and provides the requested data to the client device 102 upon an affirmative cache hit. When the requested data is not available within network cache 106, a request for same can be issued by network cache 106 to an appropriate server of servers 108 to obtain the requested data for client device 102. In an exemplary implementation, network cache 106 can also store/cache a copy of the retrieved data in one of its cache entries, which can be used for serving subsequent requests for the data that are received from any of the client devices 102 or from the same client device that earlier requested the data. By storing the data in network cache 106, subsequent requests for the same data can therefore be served by network cache 106 without burdening the origin server of servers 108 that stores the data.

In operation, as network cache 106 may store copies of data requested by many different client devices 102, the limited storage available in cache 106 inevitably fills up quickly, and therefore when a request for data is made by a client device and the data is not present in the network cache 106, the request is forwarded to an appropriate server of servers 108. During storage of the newly requested data in cache 106, when it is determined that cache 106 is full, cached data in at least one of multiple cache entries of cache 106 will need to be evicted/replaced with the newly requested data. According to one aspect of the present disclosure, such eviction of currently cached data can be performed by estimating, for one or more of the multiple cache entries, various factors relating to replacement cost, including, but not limited to, (i) the computational cost of reproducing data cached therein by respective origin storage devices from which the respective cached data originated and (ii) an estimated communication latency between cache 106 and the respective origin storage devices. Based on the estimated replacement cost of reproducing the cached data from the original storage device such as servers 108, the currently cached data within a cache entry can be replaced with the newly requested data. In another aspect, an amount of time it takes for cache 106 to re-create a cache entry and store data therein can also be taken into consideration when selecting among currently cached data to be evicted. For instance, cached data associated with a relatively low communication latency and/or a relatively low computational cost may be replaced as such data can be more efficiently retrieved from the origin server in comparison to the newly requested data or other currently cached data.

Those skilled in the art will appreciate that a cache replacement policy in accordance with embodiments of the present invention may be based on any or a combination of various factors associated with replacement cost, including, but not limited to, communication latency, computational cost of reproduction of the cached data from an origin server/storage device and estimated time for cache 106 to create a particular cache entry and store data therein.

While embodiments of the present disclosure may be described with reference to a network cache that can be configured independently of or integrated within an ADC 104, teachings of the present disclosure are thought to be applicable to other applications, including, but not limited to cache replacement policies for standalone caches and/or network caches that are associated with a particular server or for cache management of a single computing device.

Figure 1B:
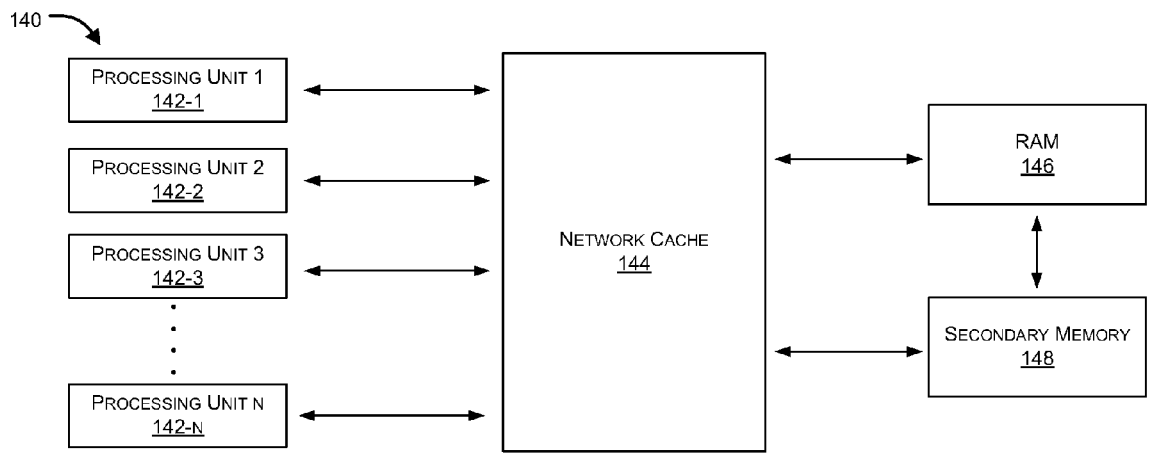

FIG. 1B illustrates an exemplary network cache 144 that is configured between multiple processing units 142 and a RAM 146/secondary memory 148, wherein aspects of the present disclosure can be applied to network cache 144 to implement its replacement policy. As explained above with reference to FIG. 1A, responsive to receiving a request for data by any of processing units such as 142-1, 142-2, ..., 142-N, cache 144 is first checked to determine whether the requested data is among that currently cached within network cache 144. When the requested data is not found within network cache 144, the requested data is retrieved on behalf of the requesting processing unit from RAM 146/secondary memory 148, wherein after retrieving the data, a copy of the requested data can be cached in network cache 144. According to one embodiment, during the course of caching the requested data, assuming cache 144 is full and it is desired to cache the requested data, cached data associated with one of cache entries of cache 144 will be replaced/evicted, wherein such eviction of cached data involves implementing a cache replacement policy involving estimating one or more of various factors relating to replacement cost of one or more of the data currently cached and the requested data. As noted above, replacement cost may be calculated on the basis of one or more factors, including, but not limited to, an estimated computational cost of re-creating the data at issue, an estimated communication latency between cache 144 and an origin server hosting the data at issue and an amount of time it takes cache 144 to create/re-create a cache entry for the data at issue. Thus, in the present example, the cache replacement policy may involve (i) evaluating a computational cost of reproducing data cached within each of the multiple of cache entries by respective origin storage devices from which the respective cached data originated (for instance, a time that secondary memory 148 is estimated to take to reproduce the cached data); (ii) evaluating a computational cost of reproducing the newly requested data from the origin storage device on which the newly requested data resides; (iii) estimating a communication latency between cache 144 and the respective origin storage devices (for instance, a latency between cache 144 and RAM 146/secondary memory 148) and (iv) estimating an amount of time for cache 144 to create a cache entry and store the data at issue. Based on a function involving one or more of these various factors, cached data stored within a particular cache entry may be selected for eviction/replacement as a result of having a lower replacement cost that that of the requested data. It may be more efficient to cache a particular data item over another due to the ease of which the particular data item can be reproduced directly from the origin storage device. For instance, cached data associated with a relatively lower communication latency and/or a relatively lower computational cost can be more easily recreated and/or replaced within cache 144 in comparison with other cached data or the newly requested data that may be associated with a relatively high communication latency and/or computational cost.

Figure 1C:
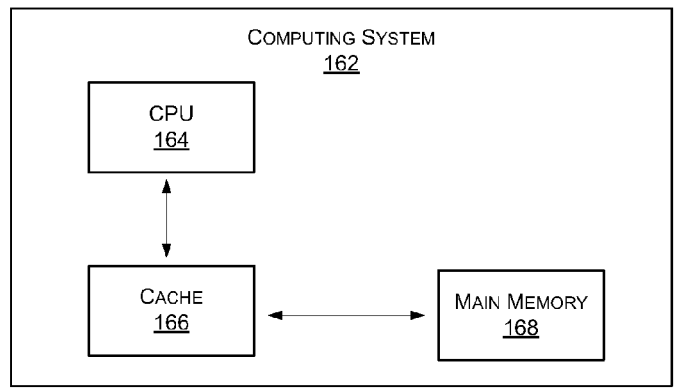
Figure 1D:
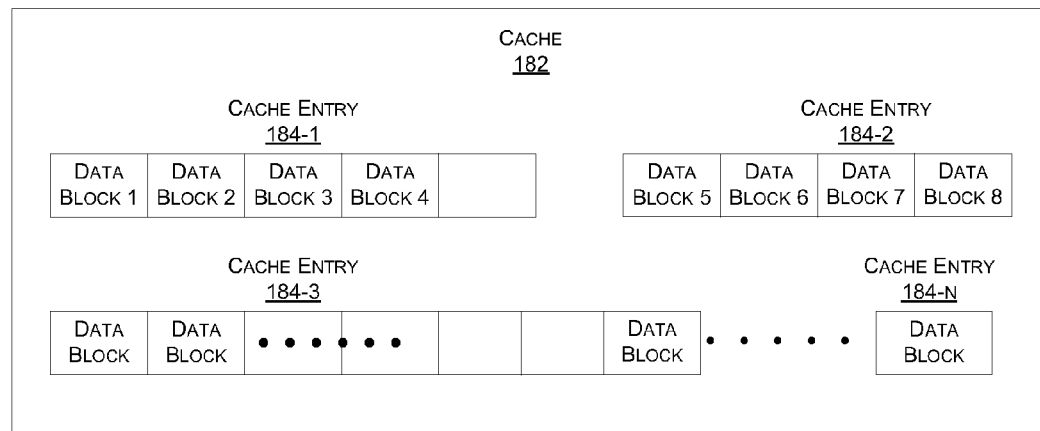

In an aspect, such a cache replacement policy can also be used for a computing device 162 as shown in FIG. 1C, wherein a cache 166 is operatively coupled between a processing unit/CPU 164 and a main memory 168. FIG. 1D, for better clarity and easier explanation of cache structure, illustrates an exemplary cache 182 having multiple cache entries 184-1, 184-2, ..., 184-C (which may be individually and/or collectively referred to as a cache entry) configured therein, wherein each cache entry 184 can store cached data as shown. In an aspect, the size/amount of data cached within each cache entry 184 may be different or may be homogenous depending on the configuration of the system. Cache entries 184 can be considered to be logical groupings of available spaces in cache 182 or can be considered as continuous physical address locations in the cache 182. In an exemplary implementation, logical groupings for available spaces in the cache 182 can be performed to create one or more cache entries 184. Each of the cache entries 184 may use one or more data blocks to accommodate their respective cached data. In an exemplary implementation, cached data within a single cache entry 184 may span all or a subset of the one or more data blocks. For instance, cached data within cache entry 184-1 may utilize all or a portion of data blocks 1-4, and cached data within cache entry 184-2 may utilize all or a portion of data blocks 5-8. Alternatively, the data blocks may represent various ways of an N-way set associated cache scheme. In an exemplary implementation, the system of the present disclosure can be configured to replace cached data stored in a cache entry 184 (say in 184-1).

Alternatively, embodiments of the present invention can be configured to replace only a subset of the cached data/blocks of a particular cache entry. Therefore, although embodiments of the present invention are described assuming the entirety of a cache entry as a unit of replacement, it is contemplated that the unit of replacement may be individual or groups of data blocks. For example, in an exemplary implementation, a single cache entry 184 can be used to store one or more data blocks related to a particular data session or a particular application or a particular user.

In an exemplary implementation, a defined space in one or more cache entries 184 can be reserved for use by cache 182, and may not be used for storing data related to any communication session/application/user/device. Such space can, for instance, be used for storing command codes, counters, information on number/type/characteristics of data blocks, among other parameters. It may also be possible to have some portion of each cache entry 184 to be reserved as additional space to store cache management related data that is not part of the cached data. In an exemplary implementation, the additional space taken up by cache entries 184 may not be part of the cached data and may only be used for storing overhead information (e.g., cache-control directives, flags (e.g., dirty, stale or the like), time stamps and the like) for managing the respective cache entries.

In another aspect, it is to be appreciated that although embodiments of the present disclosure are explained with reference to a single internal cache, the cache architecture may also involve an external second level (L2) cache or other cache memory organizations. Also, in an aspect, a cache can be managed/controlled by a cache controller, wherein the cache can have any other construction than the exemplary structure explained above, wherein a cache can include a cache array and a cache controller, wherein the cache array can have a multiple number of entries, each entry storing a tag, a multiple number of state bits corresponding to the tag. Included in the multiple number of state bits can be a modified bit and a multiple number of other configured bits indicative of the status of the data blocks stored/cached therein. The cache controller can be coupled to the cache array, wherein the controller can store new entries in the cache array in response to accesses by a data processor/processing unit such as CPU 164/142/102.

Figure 2:
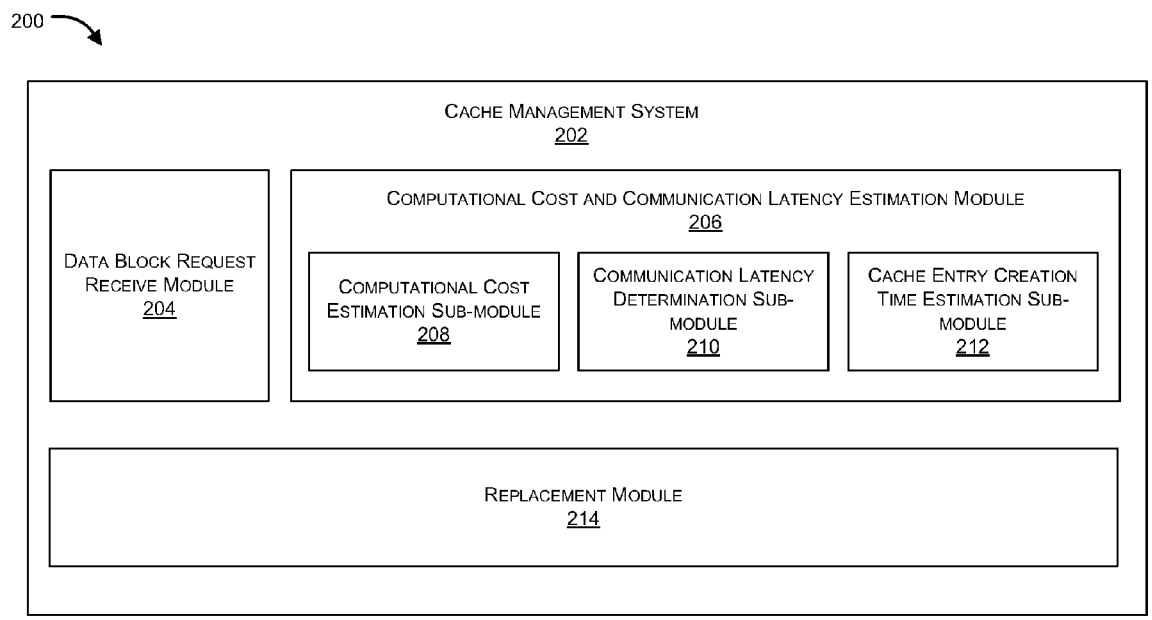
FIG. 2 illustrates exemplary functional modules of a cache management system in accordance with an embodiment of the present invention.

FIG. 2 illustrates exemplary functional modules 200 of a cache management system 202 in accordance with an embodiment of the present invention. In an aspect, a cache management system 202 can include a data block request receive module 204 that can be configured to receive a request, from a client device, for a first data block. System 202 can further include a computational cost and communication latency estimation module 206 that can be configured to estimate, for one or more of the multiple cache entries, any or a combination of a computational cost of reproducing data cached within each of the cache entries by respective origin storage devices from which the respective cached data originated, and/or estimate communication latency between the cache and the respective origin storage devices; and/or estimate time that the cache takes to recreate a new cache entry for each of the one or more cache entries. System 202 can further include a replacement module 214 that can be configured to enable the cache to replace data cached within a cache entry of the multiple cache entries with the requested data based on the estimated computational cost and/or the estimated communication latency and/or the estimated cache entry creation time for each of the cache entries.

According to one embodiment, data block request receive module 204 can be configured to receive requests for one or more data items from the same or different client devices/processing units. As described further below, such one or more data items may or may not be cached. A description of various policies based on which currently cached data can be evicted to store newly requested data is described further below.

According to one embodiment, computational cost and communication latency estimation module 206 can include a computational cost estimation sub-module 208 that can be configured to estimate, for one or more of multiple cache entries, any or a combination of a computational cost of reproducing data cached therein by respective origin storage devices from which the respective cached data originated. Module 208 can therefore be configured to compute, for example, the amount of time that a server/content delivery device takes to process a request for data, retrieve the requested data, and return same to the cache, wherein a longer time is indicative of inefficiency/longer delay in serving the data request.

Module 206 can further include a communication latency determination sub-module 210 that can be configured to estimate communication latency between the cache and the respective origin storage devices. Module 206 can further include a cache entry creation time estimation sub-module 212 that can be configured to estimate time that the cache takes to recreate a new cache entry for each of the one or more cache entries, wherein the cache entry creation time can include time taken for evicting currently cached data and storing new data within the newly available cache entry.

In an aspect, based on one or a combination of computational cost, network latency, and cache entry creation time, total replacement cost for data cached in one or more cache entries can be computed. In an exemplary implementation, cached data having a relatively low total replacement cost as compared to other cached data and newly requested data can be removed/evicted from a full cache to make room to cache the newly requested data in the cache as such easily replaceable data can be efficiently requested directly from the origin server and/or re-cached at a later point in time, if needed. On the other hand, it may be determined the newly requested data will not be cached in view of a relatively high replacement cost for recreating the currently cached data. Those skilled in the art will appreciate that the total replacement cost based cache management policy described herein can either be executed independently or can be combined with other well known techniques for cache replacement, such as least recently used (LRU), most recently used (MRU), data block size based replacement, among other known mechanisms. In another embodiment, when multiple cache replacement techniques are to be used in combination, each technique/policy can be assigned a weight based on which replacement values for cached data can be computed in a weighted manner, and based on a final value a cached data of a particular cache entry can be selected for being replaced.

In an exemplary implementation, total replacement cost for a cached data within a particular cache entry can be calculated with respect to different servers from which the same data can be retrieved, and a replacement cost reflecting, for example, an aggregate of the computational cost and the network latency with respect to each server can be calculated. Replacement cost for a particular data item can therefore, in an aspect, be calculated considering availability of the same data from different servers. For a particular data item, the replacement cost for retrieving that data from different servers can be calculated and the server with which the computational cost and communication latency is lowest can be considered for replacement of the particular data, wherein the replacement cost in such cases for the particular data may reflect the minimum of the calculated replacement costs. When it is determined that cached data is to be evicted from the cache, the cached data within a cache entry that has the lowest replacement cost as compared to other cache entries in the cache can be removed from the cache. Therefore, the outgoing cache entries will typically have the lowest replacement cost relative to other cache entries.

In another aspect, a replacement cost based technique can also be applied to the newly requested data that is a candidate for storage within the cache. For instance, when a client device requests multiple data items, sub-module 208 can be configured to estimate a computational cost of reproducing each of the data items by respective origin storage devices from which the respective data items originated, and sub-module 210 can be configured to estimate communication latency between the cache and the respective origin storage devices. In such a manner, requested data that has the highest estimated computational cost and estimated communication latency can selected for caching over requested data items that are more easily recreated by interacting with the origin server, for example. In an aspect, of this implementation, estimated computational cost and/or estimated communication latency for the selected data item is higher than the respective computational cost and/or communication latency values for the other requested data items. In another aspect, a requested data item having computational cost and/or estimated communication latency that is lower than a defined threshold can be directly accessed from respective origin storage device that stores the data item. In yet another aspect of the present implementation, the selected data item can be selected at least in part based on a number of storage devices that store the selected data item.

Those skilled in the art will appreciate that modules 208, 210, and 212 can either be configured to operate in parallel or in serial for each data item. Furthermore, while implementing a replacement cost-based policy as described herein, any or a combination of computational cost, communication latency, and cache entry re-creation time can be taken into consideration along with other factors.

In an exemplary implementation, replacement module 214 can be configured to enable the cache to replace data cached within a particular cache entry of a cache with the incoming/new data item based on the estimated computational cost and the estimated communication latency for each of multiple cache entries. In an exemplary implementation, the computational cost and/or the communication latency for the outgoing cache entry is deemed to be lower in comparison with respective values for the other cache entries. In another exemplary implementation, replacement module 214 can be configured to cache newly received data further based on any or a combination of a size of the data, a least frequently used cache entry, the size of cached data of other cache entries, a number of times the currently cached data has been previously cached/accessed, and a sequence of caching of the cached data, among other configured parameters/factors.

In an aspect of the present disclosure, the cache can be any or a combination of a network cache, an HTTP cache of an ADC, and a standalone cache. In another aspect, the cache can be a network cache, and at least one of the origin storage devices is a server that stores and originates respective cached data.

According to one embodiment, values of computational cost and/or communication latency can be considered during replacement only when a size of cached data to be replaced meets or exceeds a configurable and/or predefined threshold. Therefore, for example, if the minimum size for any cached data to be replaced is 3 MB, unless the cached data selected for replacement is greater than 3 MB, the new/incoming data block cannot be cached. According to another embodiment, values of computational cost and/or communication latency can be computed by the proposed system by probing origin storage devices from which the respective cached data originated. Such probing, for instance, can be implemented by sending a request for data and computing the time it takes for the server to process/retrieve the requested data (computation time) and the amount of time it takes after the requested data has been sent by the server and received by the cache/controller (latency). In yet another aspect, one or more caches can be synched with each other to update computational cost and communication latency of data cached within each of multiple cache entries. Therefore, each cache does not need to compute the replacement cost for each data item cached but can synchronize with other caches to receive the most updated replacement cost for a given/desired data item. Any other further improvement to optimize computation of replacement cost is well within the scope of the present disclosure. One can appreciate that storage server as discussed in the previous paragraphs can be any storage device from where one or more data blocks (to be or already) stored in one or more cache entries can be retrieved.

Figure 3A:
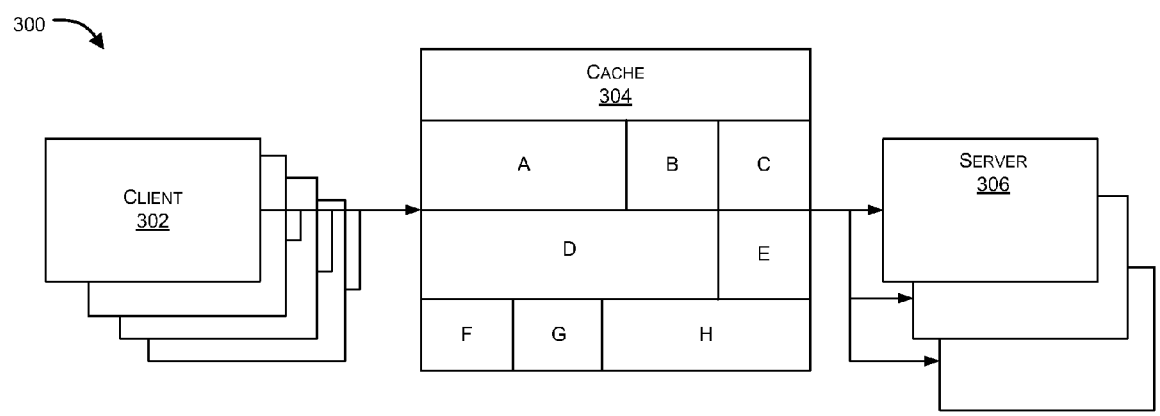
FIG. 3A is a block diagram illustrating a typical HTTP cache environment.

FIG. 3A is a block diagram illustrating a typical HTTP cache environment that can incorporate the cache management system described herein. As shown in FIG. 3, a cache 304 can include several cache entries such as A, B, C, D, E, F, G, H storing cached data of different sizes. Each cache entry may store a copy of data previously requested by one or more client devices 302, also interchangeably referred to as client 302 hereinafter, and retrieved from one or more servers/data storage devices 306. When a client 302 requests data, cache 304 can be checked to determine if the requested data is available in any of the cache entries of cache 304. When the requested data is available within cache 304, cache 304 can simply return the requested data to the requesting client 302 from cache 304. However, if the requested data is not available in cache 304, the system retrieves the requested data from an appropriate server 306. Assuming cache 304 is full, when the requested data is returned by the server 306, cache 304 makes a determination regarding whether the new data is to be cached, and if so, which of the currently cached data is to be replaced by the new data. In an embodiment, factors relating to replacement cost of the currently cached data and the new data are taken into consideration by the replacement policy. For example, the replacement cost of currently cached data can be compared to a replacement cost of the new data based on computation of a time required by server 306 to process a request for the data at issue, retrieve and return the data at issue and latency time between server 306 and cache 304. In an embodiment, cached data associated with the lowest replacement cost can be evicted from cache 304 to make space for the new data to be cached. Any other currently known or future cache replacement policy/technique can also be used along with the proposed replacement cost technique.

In an exemplary implementation, replacement costs, which can be computed as summation of (of even individually taken) computation cost (by server to process a request for the data at issue), communication latency (between cache and server), and cache entry creation time, for all existing cached data within cache 304 can be computed (in real-time or at periodic intervals) and tracked/maintained by cache 304, wherein cache 304 can use such replacement cost information alone or in addition to other parameters and cache replacement techniques.

Figure 3B:
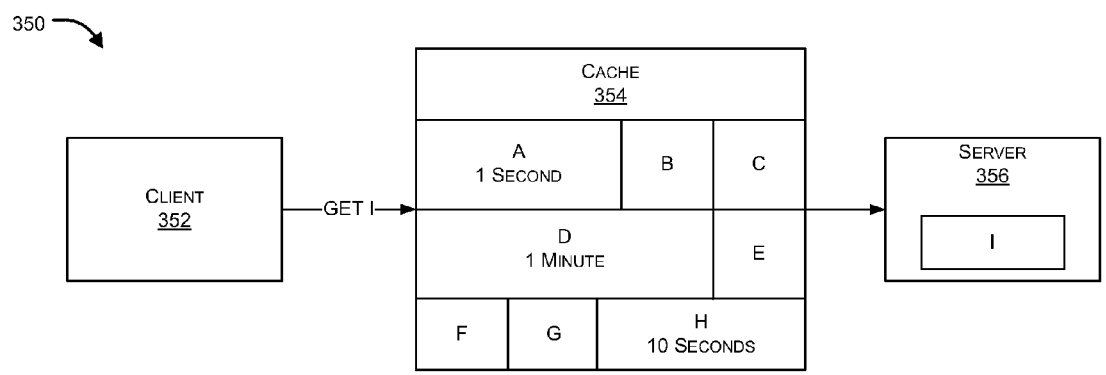
FIG. 3B is a block diagram illustrating a typical cache with largest item replacement policy.

FIG. 3B is a block diagram illustrating a cache 354 implementing a largest item based replacement policy that can be used in combination with the proposed replacement cost technique (any or a combination of communication latency, computational cost, and cache entry creation time) in accordance with an embodiment of the present disclosure. As shown in FIG. 3B, client 352 can request a data item "I" that is not available in cache 354, and hence data item "I" is retrieved from server 356. FIG. 3B shows a replacement cost of cache entry A as 1 second (it may store a relatively small image file, for example), a replacement cost of cache entry H as 10 seconds (it may store a relatively large word document, for example), and a replacement cost of cache entry D as 1 minute (it may store a document generated from a database, for example). In an exemplary implementation, if it has been determined it is desirable to cache a copy of data item "I" within cache 354, the largest item based replacement policy may indicate that either data stored in cache entry A, or stored in cache entry H, or stored in cache entry D should be evicted as the data cached therein is of the largest size, and the system may finally decide on data cached in cache entry D to be replaced (as it has the largest size). However, should the largest item based replacement policy be used in combination with the proposed replacement cost technique described herein (any or a combination of communication latency, computational cost, and cache entry creation time), it may be instead determined that it is more advantageous to replace the data cached in cache entry A as it has the lowest overall replacement cost, and hence the data currently cached in entry A would be most easily recreated, if needed in the future.

Figure 4:
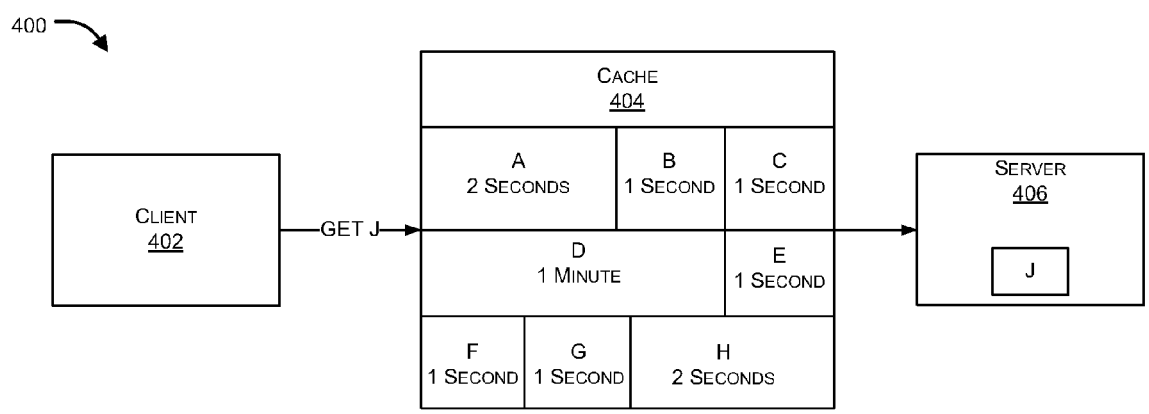
FIG. 4 is a block diagram illustrating a computational cost and latency based cache replacement policy in accordance with an embodiment of the present invention.

FIG. 4 is a block diagram illustrating a computational cost and latency based cache replacement policy in accordance with an embodiment of the present invention. As shown in FIG. 4, cache 404 can estimate replacement cost (e.g., based on any of a combination of communication latency, computational cost, and cache entry creation time) for data cached in each cache entry and represent the replacement cost in terms of total time it would take to replace the cached data. In an exemplary implementation, replacement cost for data stored in the cache entries can be updated at the time of storing the data blocks in their respective cache entries. In another exemplary implementation, replacement cost for each data block stored in the cache entries can be updated at regular time intervals or in real-time. FIG. 4 shows replacement costs for data cached in each cache entry, for instance, replacement cost for data stored in cache entry A is 2 seconds, for data stored in cache entry B is 1 second, and so on. In an implementation, when a client 402 requests data item "J" that is not available in cache 404, data item "J" may be retrieved from server 406, and (assuming cache 404 is full) cache 404 can determine which cache entries A-H is to be evicted based on their respective replacement costs. As described above, based on the respective replacement costs, cached data from any of cache entries B, C, E, F, or G can be replaced with a copy of data item "J". In some embodiments, the decision of which cache entry to evict can further be based upon the frequency of use of the corresponding currently cached data, the size of the respective currently cached data, among other similar parameters. In another exemplary implementation, requested data item "J" will only be cached within cache 404 if its replacement cost is greater than the replacement costs of the currently cached data associated with cache entries A-H. In another embodiment, the proposed replacement cost mechanism described herein can be used in conjunction with one or more other standard cache replacement policies, such as a largest replacement policy, in which case, if there are currently cached data items that are larger than a configurable and/or predetermined size, their respective replacement costs can be used to select among them. Therefore, a replacement cost computation based cache management approach as described herein can always be used in conjunction with other known replacement policies to increase the efficiency of eviction of appropriate cached data.

Figure 5:
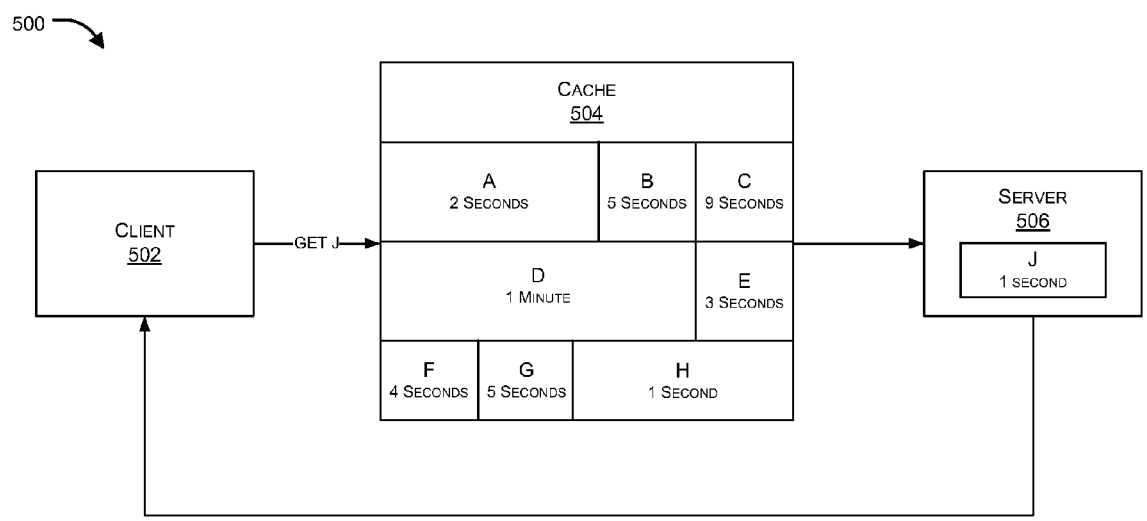
FIG. 5 is a block diagram illustrating access to a data item directly from an origin server based on computation cost and latency of the data item in accordance with an embodiment of the present invention.

FIG. 5 is a block diagram illustrating access to a data item directly from an origin server 506 based on computation cost and latency of the item/data block in accordance with an embodiment of the present invention. As shown in FIG. 5, an estimated replacement costs of data cached in each of cache entries A-H is shown, wherein, for instance, replacement cost of data stored in cache entry A is 2 seconds, of data stored in cache entry B is 5 seconds, and so on. When a client 502 requests data item "J" that is not available in cache 504, it can be retrieved from server 506, and replacement cost (e.g., any of a combination of communication latency, computational cost, and cache entry creation time) can be calculated for the data item "J", which as shown in FIG. 5, is 1 second. In an exemplary implementation, as the replacement cost of requested data block "J" is relatively low, it may be determined by cache 504 not to locally cache a copy of data item "J", and enable client 502 to directly access/process data item "J" from server 506. Therefore, based on the replacement cost policy of the present disclosure, a requested data item may bypass cache 504 completely, in which case, as the replacement cost of data item "J" is 1 second, while the rest of the entries in the cache have a greater or equal replacement cost, cache 504 may decide not to store data item "J" because it would mean evicting one of the equivalent or higher cost replacement data items. By having such a replacement policy therefore, not only does it save time for the next client that may request currently cached data that would take a long time to compute, it also avoids the computational cost of evicting an existing cache entry and creating a new entry.

Figure 6:
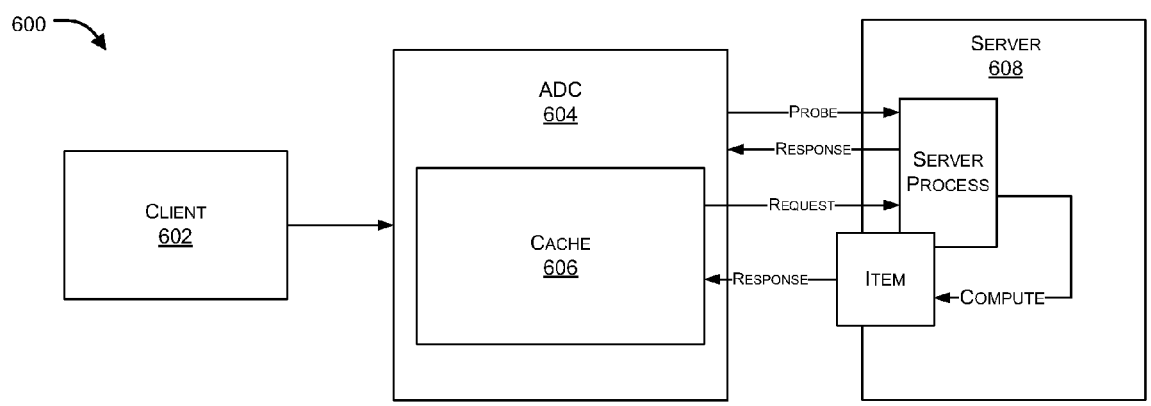
FIG. 6 is a block diagram illustrating computation of replacement cost of a cached data item based on computational cost/processing time and latency/network time involved in caching the item in accordance with an embodiment of the present invention.

FIG. 6 is a block diagram 600 illustrating computation of replacement cost of a cached data item based on computational cost/processing time and latency/network time involved in caching the data item in accordance with an embodiment of the present invention. As shown, a system 600 in accordance with the present disclosure can include a client device 602 that is operatively coupled with an ADC 604 having a cache 606, wherein the ADC 604 can manage requests from/to a server 608 that stores one or more data items that may be requested by client 602 and cached within cache 606. Those skilled in the art will appreciate that cache 606 is illustrated as a module within ADC 604 simply to illustrate an exemplary usage model, and alternative configurations and architectures may be used depending upon the particular implementation. In an aspect, in order to compute replacement time, ADC 604 may send a probe to server 608, based on the response to which, ADC 604 can calculate a network cost of a request for data from server 608. A client request can then be sent, and the difference between the request and the corresponding response can be defined as the total replacement time cost of the data item. Based on such information, the system can compute the replacement cost minus the network cost as the computation cost.

Figure 7:
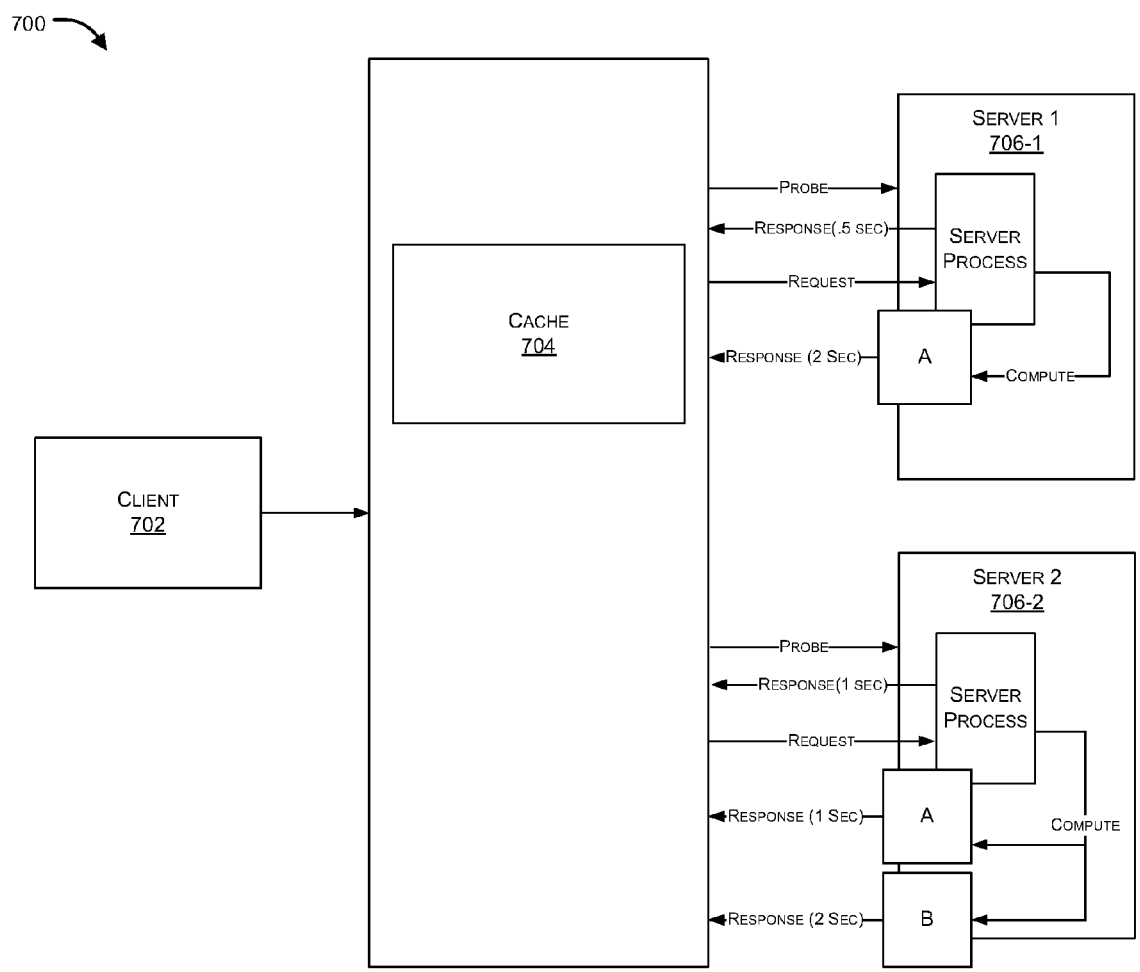
FIG. 7 is a block diagram illustrating caching of a data item based on computation of replacement cost of multiple data items in accordance with an embodiment of the present invention.

FIG. 7 is a block diagram 700 illustrating caching of a data item based on computation of replacement cost of multiple data items in accordance with an embodiment of the present invention. FIG. 7 shows a more specific example of replacement costs. As shown, server 706-1 takes 0.5 seconds to reply to a probe whereas server 706-2 takes 1 second to reply to a probe, and therefore server 706-1 has a higher network cost. From server 706-2, the computation cost for data item A is 1 second and the computation cost for data item B is 2 seconds, and therefore computation cost of item B is higher. From server 706-1, on the other hand, the replacement cost (latency+computation) of data item A is 2 seconds and the computation cost is therefore 1.5 seconds. From Server 706-2, for data item A, the replacement cost is 1 second and the computation cost is 0 (nearly instantaneous), and therefore the network is slower in relation to communications with server 706-2 but it likely has a faster CPU.

In an exemplary aspect, it may be sufficient to simply keep track of the computation time of an entry. However, the computation cost may be helpful to consider in view of cache revalidation, wherein when a request comes in from a client for a data item cached within a particular cache entry but that is not fresh, cache 704 will verify with the origin server that the cache entry is still okay to return. It is to be noted that time for a server to revalidate a cache entry is much shorter than to actually compute it, and can be approximated by the network cost. Therefore, since each cache entry will likely need to be revalidated in the future, the network cost cancels out and only the computation cost may need to be considered.

Figure 8:
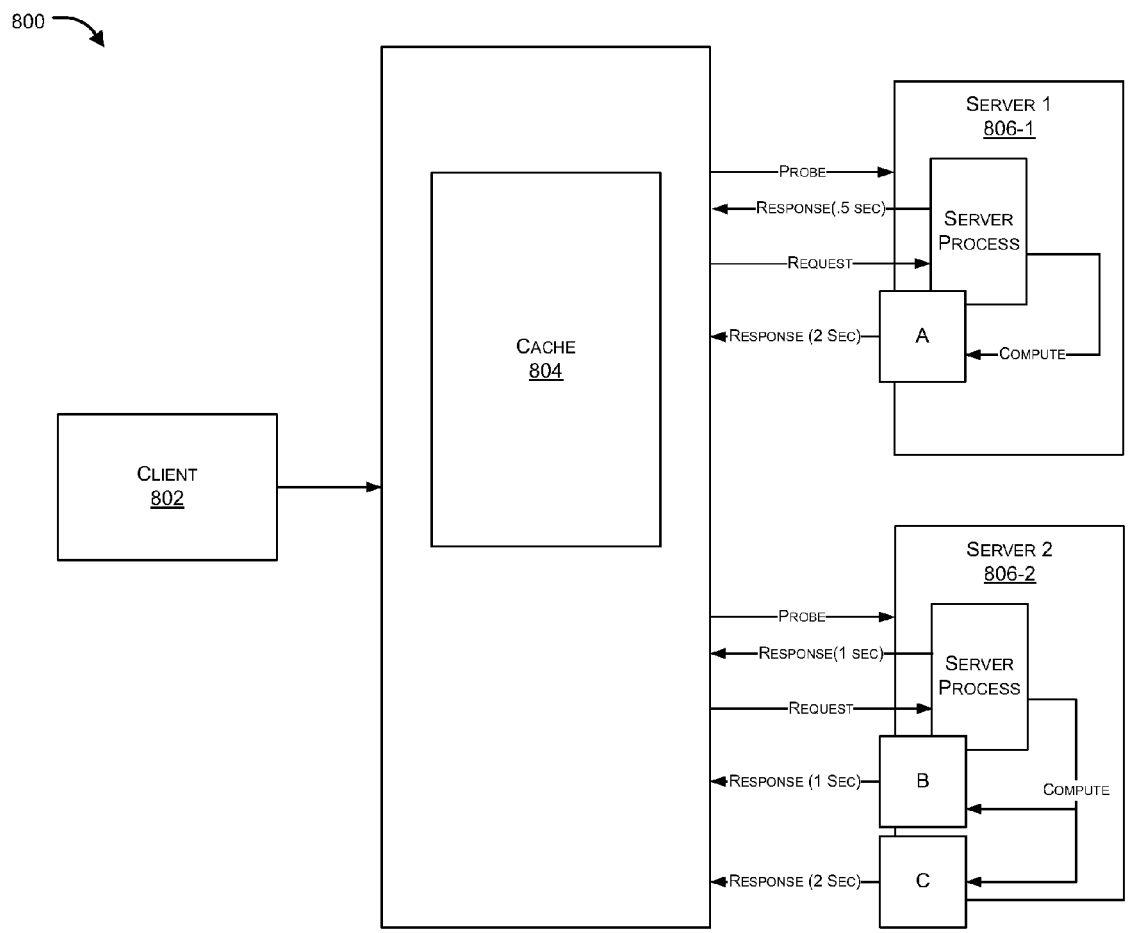
FIG. 8 is a block diagram illustrating caching of a data item based on computation of network/latency cost and computational cost of multiple data items in accordance with an embodiment of the present invention.
Figure 9:
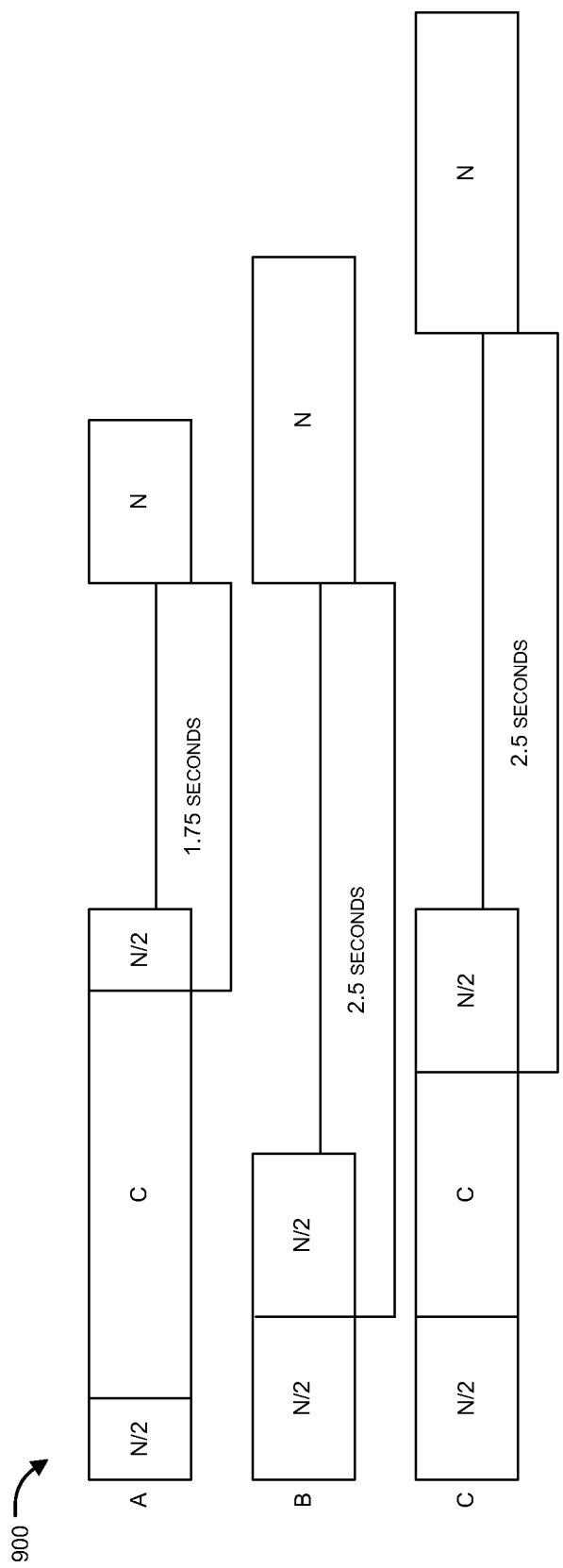
FIG. 9 illustrates a computation of a replacement cost of a data item in a cache in accordance with an embodiment of the present invention.

FIG. 8 is a block diagram 800 illustrating caching of a data item based on a computation of network/latency cost and computational cost of multiple data items in accordance with an embodiment of the present invention. As shown, cache 804 is choosing one of three entries (A, B, C) to evict because it has received a request for a fourth entry (not shown) from client 802. The replacement costs are shown with reference to FIG. 9, wherein FIG. 9 illustrates computation of network cost of caching of a data item in cache 804 in accordance with an embodiment of the present invention. In an aspect, with reference to FIG. 9, network cost of each entry can be shown as N/2 initially as the timeline starts as soon as the response is computed by the server. In an aspect, freshness timelines can be artificially short, for instance, they can normally be much longer, around 5 minutes. FIG. 8 shows, for example, that cache entries storing copies of data items B and C have the same freshness timeline length, and therefore between the two of them, data item C would be left in the cache because it is more expensive to replace. Data items A and C have the same total replacement cost, but the network cost is shorter as well as freshness lifetime, meaning that every 1.75 seconds, the cache needs to spend 0.5 seconds to validate the entry. Comparing the two, we see that even still, data item C is more expensive to keep in the cache: (for A 0.5/1.75 seconds=0.28, and for C 1/2.5=0.4 seconds of network delay per second of lifetime). It is to be appreciated that this example is not meant to be definitive, but merely to illustrate that computation time, network time, and freshness time may all be considered when making a decision regarding whether to cache a particular data item and/or what cache entry should be evicted when the cache is full.

Figure 10:
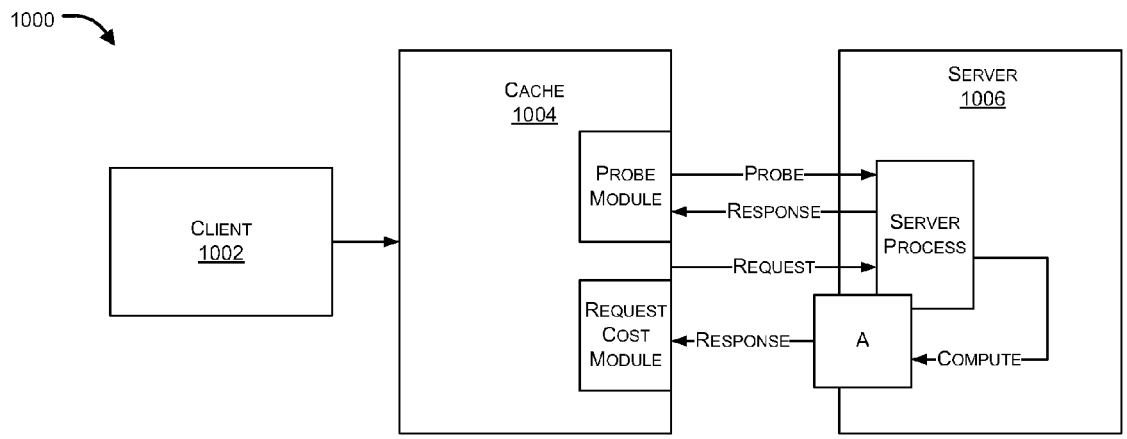
FIG. 10 is a block diagram illustrating use of a standalone cache for estimating computational cost and latency of a data item in accordance with an embodiment of the present invention.
Figure 11:
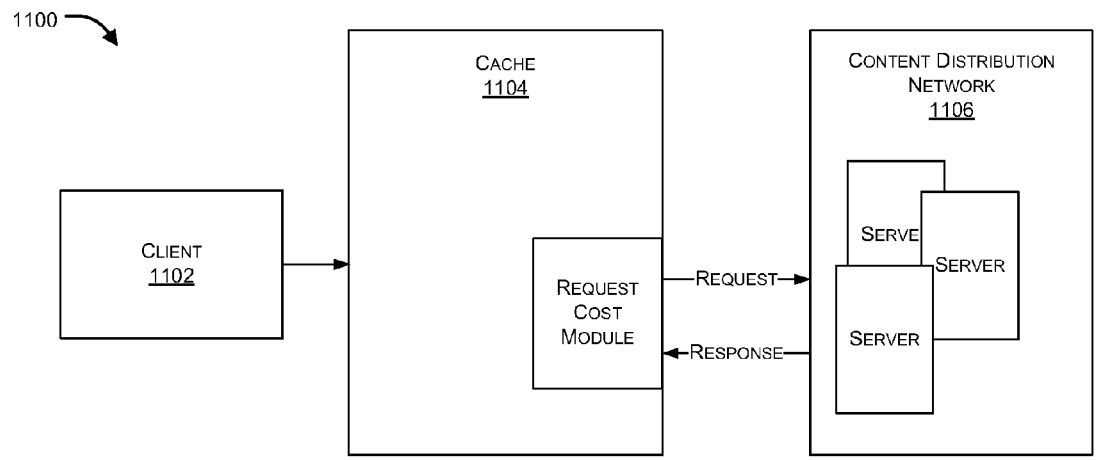
FIG. 11 is a block diagram illustrating use of a standalone cache with a content distribution network for estimating computational cost and latency of an item in accordance with an embodiment of the present invention.

FIG. 10 is a block diagram 1000 illustrating use of a standalone cache for estimating computational cost and latency of a data item in accordance with an embodiment of the present invention. FIG. 10 functions in the same manner as FIG. 6 with a difference being that specialized modules are present in a standard cache 1004 rather than an ADC for providing probing capabilities. FIG. 11 is a block diagram 1100 illustrating use of a standalone cache with a content distribution network for estimating computational cost and latency of a data item in accordance with an embodiment of the present invention. FIG. 11 is also similar to FIG. 10 with a difference being that the cache obtains responses from a content distribution network 1106 (maybe an ADC, maybe a network with many servers that use other technology to route requests). In this exemplary scenario, there may be no efficient way to probe the network, and therefore there may be no probe module active in cache 1104. However, the cost module may be able to keep track of the cost of every response and still apply a simplified form of a replacement cost policy.

Figure 12:
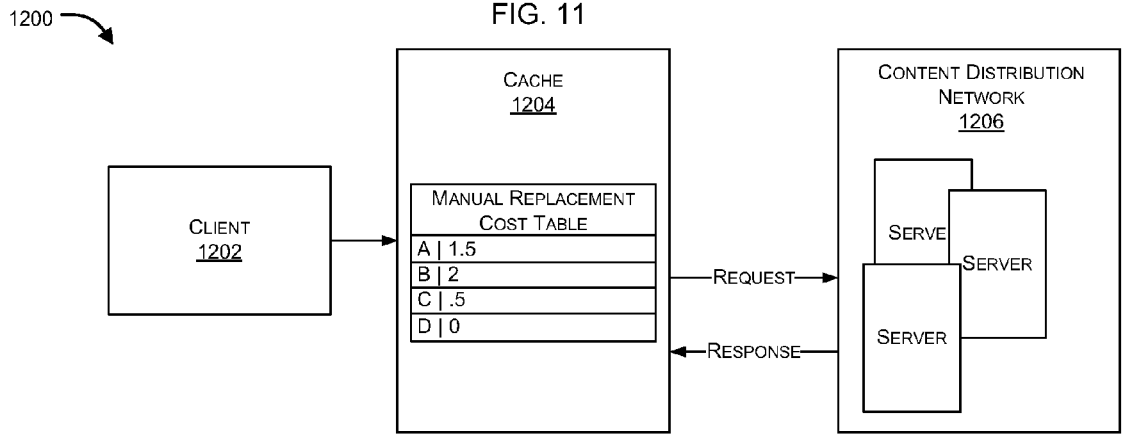
FIG. 12 is a block diagram illustrating use of a cache to store a cost table that is indicative of a replacement cost for each item stored in the cache in accordance with an embodiment of the present invention.

FIG. 12 is a block diagram 1200 illustrating use of a cache to store a cost table that is indicative of a replacement cost for each data item stored in a cache in accordance with an embodiment of the present invention. FIG. 12 also illustrates an example similar to that depicted in FIGS. 10 and 11, but includes the use of statically configured manual costs (maintained in a cost table, for example) rather than computing them. Such an embodiment may benefit from additional knowledge and configuration supplied by a network administrator but does not rely on any additional probing or cost calculation by cache 1204.

Figure 13:
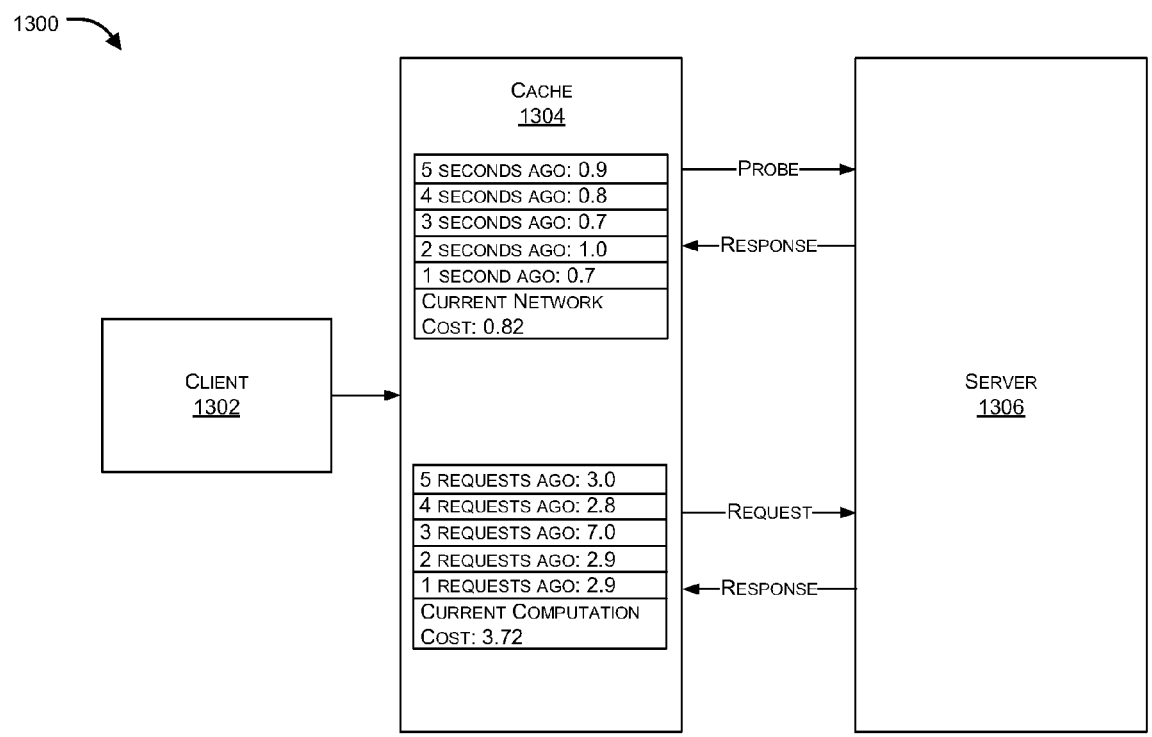
FIG. 13 is a block diagram illustrating use of historical values of computational/processing cost and latency of one or more cache entries in accordance with an embodiment of the present invention.

FIG. 13 is a block diagram 1300 illustrating use of historical values of computational/processing cost and latency of one or more data items associated with cache entries in accordance with an embodiment of the present invention. FIG. 13 illustrates implementation of an exemplary cost computation mechanism based on a 5 second sliding average. Those skilled in the art will appreciate that many similar algorithms are possible and can be configured to compute/store/maintain the computation/replacement costs, and that the example of FIG. 13 is merely for illustration. As shown in FIG. 13, cache 1304 maintains a data structure that stores probe results of the last 5 probes and calculates an average of these. Similarly, cache 1304 can store request computation time results of the last 5 times that a particular data item was requested, and calculates the average, wherein an objective of such an exemplary cost computation mechanism is to use trends rather than individual measurements to make caching decisions.

Figure 14:
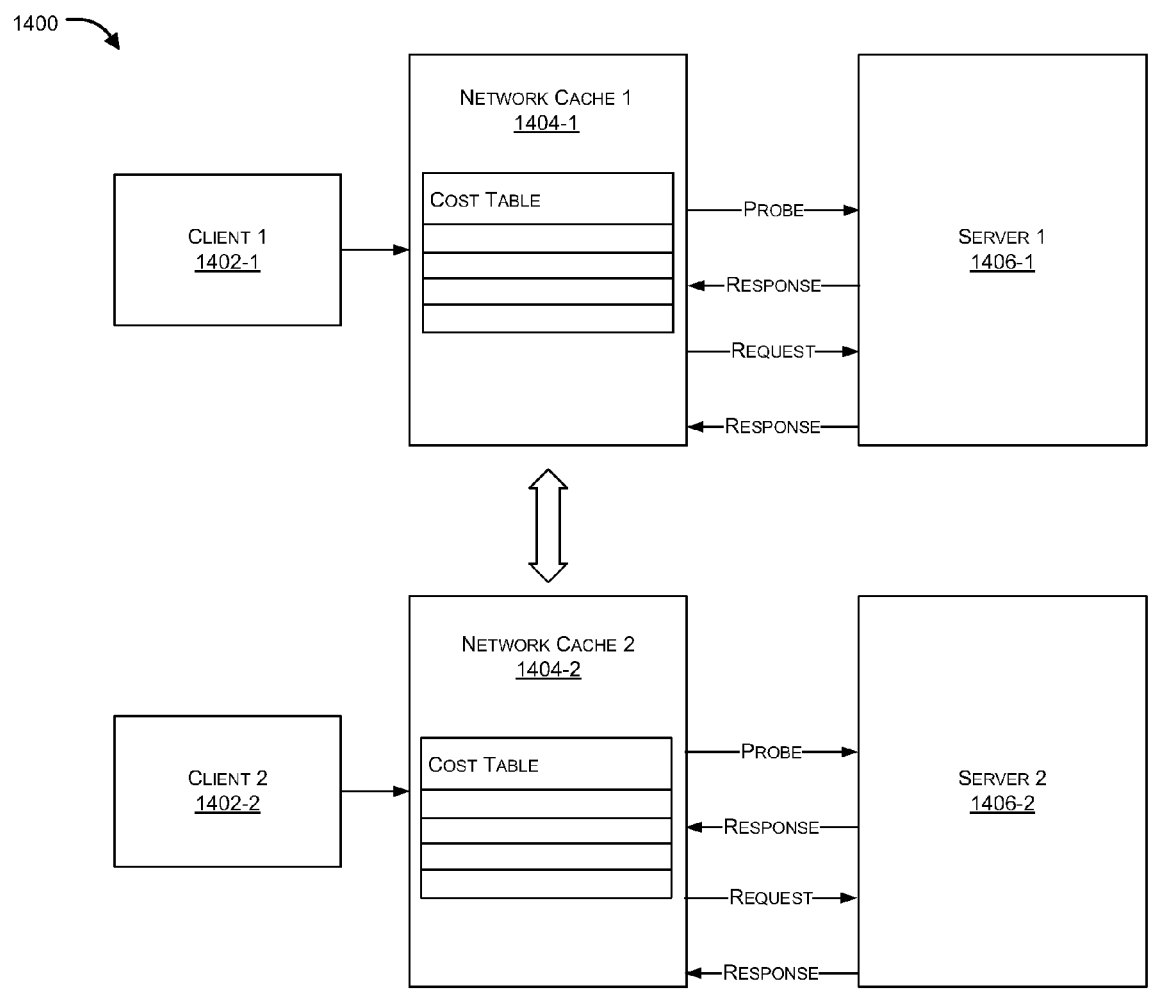
FIG. 14 is a block diagram illustrating synchronization of caches to maintain common values of replacement costs of cache entries in accordance with an embodiment of the present invention.

FIG. 14 is a block diagram 1400 illustrating synchronization of caches to maintain common values of replacement costs of data items within cache entries in accordance with an embodiment of the present invention. As shown, cost information measured by one cache such as network cache 1404-1 can be synched with another cache, network cache 1404-2, in order to improve their respective replacement cost calculation knowledge. By such synchronization, each cache 1404 does not need to compute replacement cost for each cached data item. However, when the characteristics of each cache are different, individual computations of replacement costs may be beneficial, for instance, when the communication latency between cache and the respective server is different.

Figure 15:
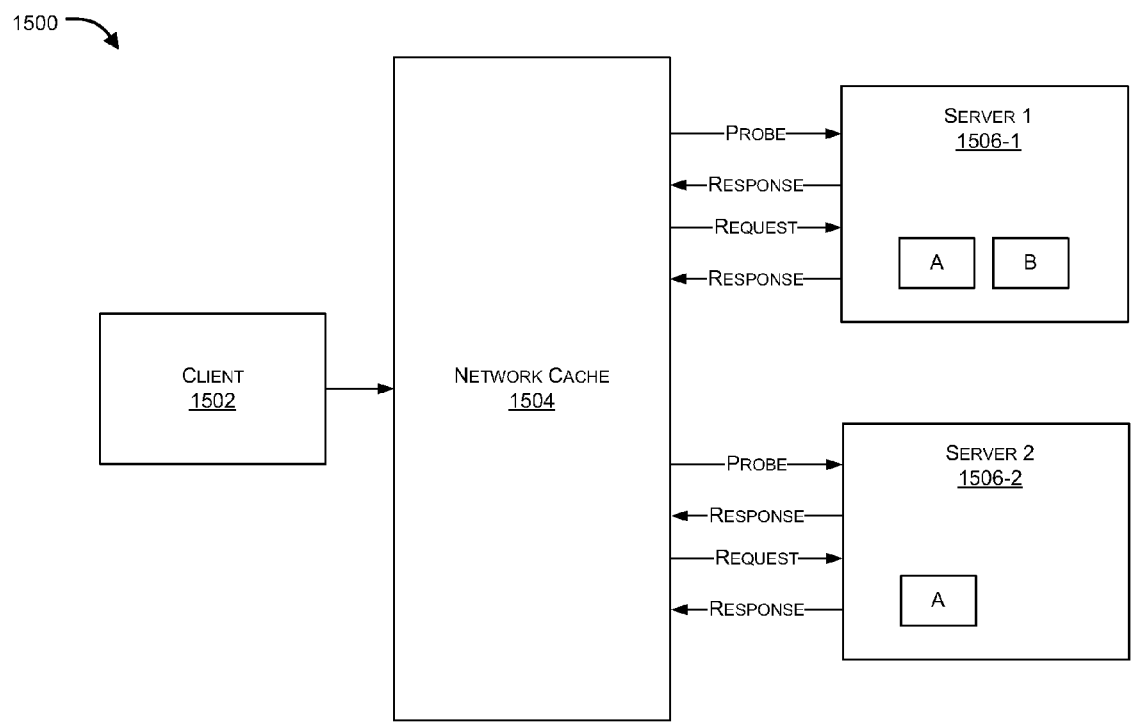
FIG. 15 is a block diagram illustrating availability-based parameters of one or more origin storage devices for defining a replacement policy in accordance with an embodiment of the present invention.

FIG. 15 is a block diagram 1500 illustrating availability-based parameters of one or more origin storage devices for defining a replacement policy in accordance with an embodiment of the present invention. FIG. 15 therefore shows another exemplary replacement cost factor, which is based on availability, wherein, in an instance, as shown, data item A is available on both servers 1506-1 and 1506-2. However, data item B is only available from server 1506-1, which can accordingly be taken into account when choosing which cached data item to evict from network cache 1504 cache. Data item B may be costlier to retrieve again in the future, for example, if server 1506-1 is down or becomes more loaded with requests.

Figure 16:
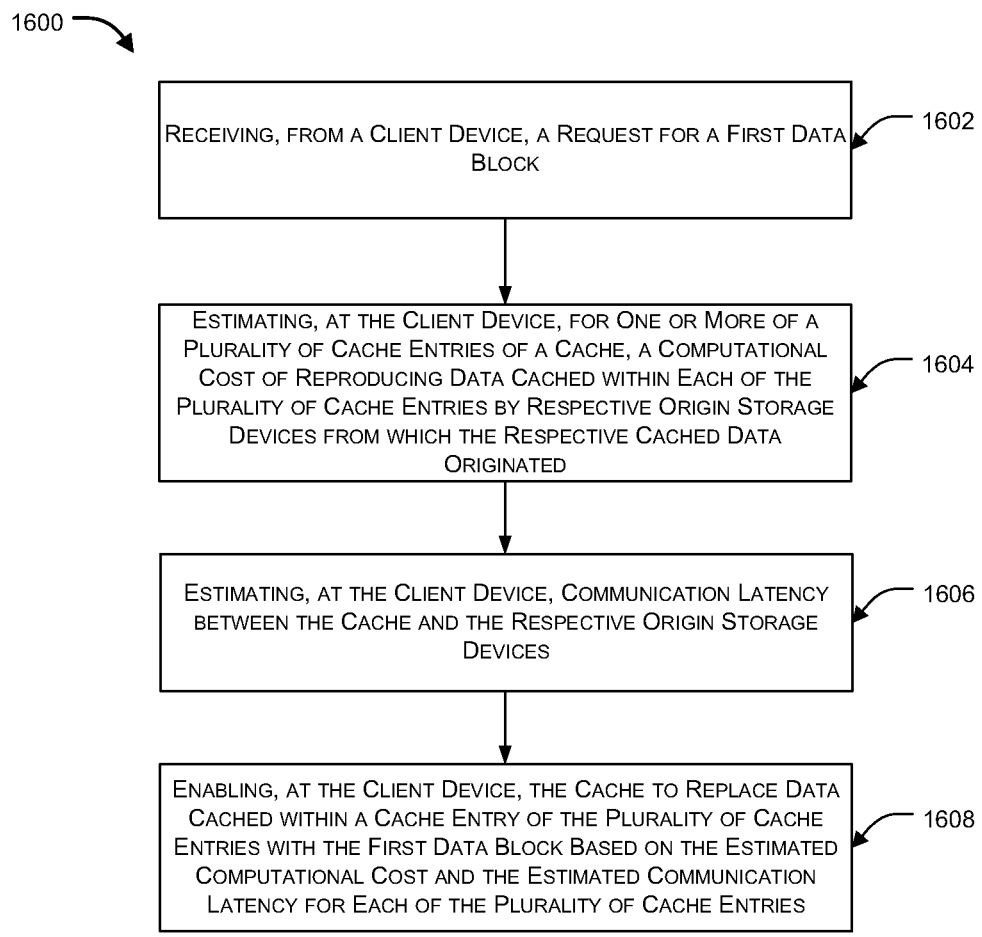
FIG. 16 is a flow diagram illustrating cache entry replacement processing based on estimation of computational cost and communication latency for such entries in accordance with an embodiment of the present invention.

FIG. 16 is a flow diagram 1600 illustrating cache replacement processing based on estimation of computational cost and communication latency for data cached within cache entries in accordance with an embodiment of the present invention. At step 1602, the method can include, receiving, from a client device, a request for data, and at step 1604, the method can include, estimating, through the client device, for one or more of multiple cache entries of a cache, a computational cost of reproducing data cached therein by respective origin storage devices from which the respective cached data originated. At step 1606, the method can include estimating communication latency between the cache and the respective origin storage devices, and at step 1608, the method can include enabling the cache to replace data cached within a particular cache entry with the requested data based on the estimated computational cost and the estimated communication latency associated with replacing the data cached within each of the cache entries.

Figure 17:
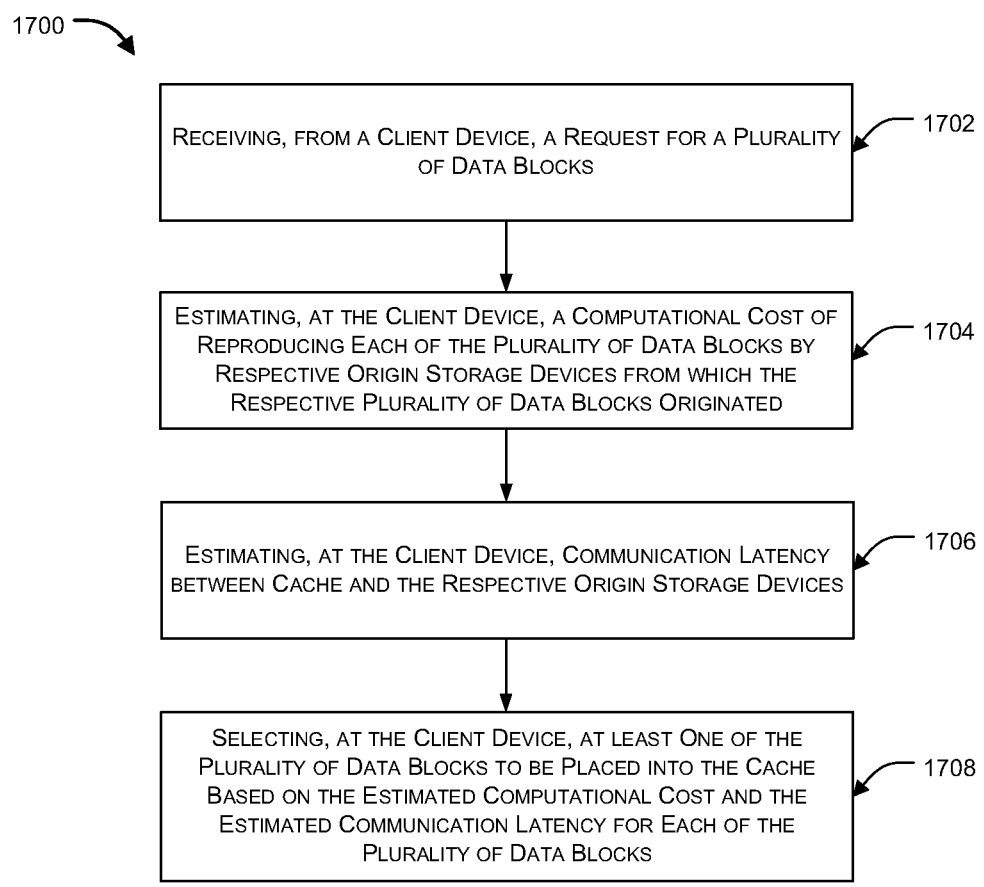
FIG. 17 is a flow diagram illustrating cache processing based on estimated computational cost and communication latency in accordance with an embodiment of the present disclosure.

FIG. 17 is a flow diagram 1700 illustrating cache processing based on estimated computational cost and communication latency in accordance with an embodiment of the present invention. At step 1702, the method can include receiving, from a client device, a request for multiple data items. At step 1704, the method can include estimating, at the client device, a computational cost of reproducing each of the multiple data items by respective origin storage devices from which the multiple data items originated, and at step 1706, the method can include estimating, at the client device, communication latency between the cache and the respective origin storage devices. At step 1708, the method can include selecting, at the client device, at least one of the data items to be placed into the cache based on the estimated computational cost and the estimated communication latency for each of the data items.

Figure 18:
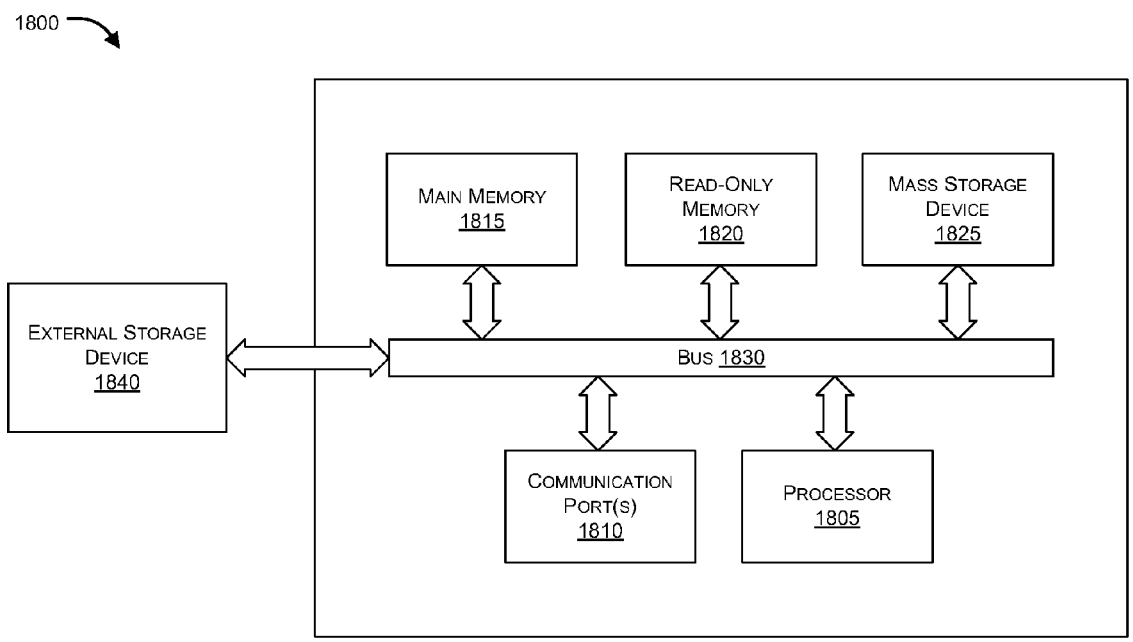
FIG. 18 is an exemplary computer system with which embodiments of the present invention may be utilized.

FIG. 18 is an exemplary computer system with which embodiments of the present invention may be utilized. Embodiments of the present invention include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As such, FIG. 18 is an example of a computer system 1800, such as an ADC (e.g., ADC 104) or other network device or computer system in which cache management processing is typically performed.

According to the present example, the computer system includes a bus 1830, one or more processors 1805, one or more communication ports 1810, a main memory 1815, a removable storage media 1840, a read only memory 1820 and a mass storage 1825.

Processor(s) 1805 can be any future or existing processor, including, but not limited to, an Intel® Itanium® or Itanium 2 processor(s), or AMD® Opteron® or Athlon MP® processor(s), or Motorola® lines of processors. Communication port(s) 1810 can be any of an RS-232 port for use with a modem based dialup connection, a 10/100 Ethernet port, a Gigabit port using copper or fiber or other existing or future ports. Communication port(s) 1810 may be chosen depending on a network, such as a Local Area Network (LAN), Wide Area Network (WAN), or any other network to which the computer system 1800 connects.

Main memory 1815 can be Random Access Memory (RAM), or any other dynamic storage device(s) commonly known in the art. Read only memory 1820 can be any static storage device(s) such as Programmable Read Only Memory (PROM) chips for storing static information such as start-up or BIOS instructions for processor 1805.

Mass storage 1825 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1830 communicatively couples processor(s) 1805 with the other memory, storage and communication blocks. Bus 1830 can include a bus, such as a Peripheral Component Interconnect (PCI)/PCI Extended (PCI-X), Small Computer System Interface (SCSI), USB or the like, for connecting expansion cards, drives and other subsystems as well as other buses, such as front side bus (FSB), which connects the processor(s) 1805 to system memory.

Optionally, operator and administrative interfaces, such as a display, keyboard, and a cursor control device, may also be coupled to bus 1830 to support direct operator interaction with computer system 1800. Other operator and administrative interfaces can be provided through network connections connected through communication ports 1810.

Removable storage media 1840 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). In no way should the aforementioned exemplary computer system limit the scope of the invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A system comprising:
   a cache having a plurality of cache entries;
   one or more processors; and
   a memory containing therein:
     a data block request receive module, which when executed by the one or more processors receives a request, from a client device, for data;
     a replacement cost estimation module, which when executed by the one or more processors determines, for each cache entry of the plurality of cache entries, a computational cost of reproducing cached data within the cache entry by respective origin storage devices from which the cached data originated by measuring a time difference between a request for the cached data issued by the system to a respective origin storage device and corresponding response received by the system and subtracting from the time difference a communication latency between the cache and the respective origin storage devices, wherein the communication latency is determined by probing the respective origin storage devices; and
     a replacement module, which when executed by the one or more processors enables the cache to replace the cached data within a selected cache entry of the plurality of cache entries with the requested data based on the computational cost.

2. The system of claim 1, wherein the replacement cost estimation module is further configured to determine times that the cache would take to recreate a cache entry for respective cached data within each of the plurality of cache entries, and wherein the replacement module is further configured to enable the cache to replace cached data within an outgoing cache entry of the plurality of cache entries with the requested data based on the determined times.

3. The system of claim 2, wherein the computational cost associated with the outgoing cache entry is lower than respective computational costs associated with all other cache entries of the plurality of cache entries.

4. The system of claim 1, wherein the cache comprises any or a combination of a network cache, a Hypertext Transfer Protocol (HTTP) cache of an Application Delivery Controller (ADC) and a standalone cache.

5. The system of claim 1, wherein the cache comprises a network cache, and wherein at least one of the respective origin storage devices comprises a server from which the respective cached data originated.

6. The system of claim 1, wherein the replacement module is configured to cache the requested data based at least in part on any or a combination of a size of the requested data, a least frequently used cache entry of the plurality of cache entries, a size of the respective cached data stored within the plurality of cache entries, a number of times the respective cached data has been accessed or previously cached, and relative timing of caching of the respective cached data.

7. The system of claim 1, wherein the replacement module is configured to enable the cache to replace the cached data within the selected cache entry when a size of the data cached within the selected cache entry is greater than a predefined or configurable threshold.

8. The system of claim 1, wherein the computational costs and communication latencies determined for the plurality of cache entries are updated with corresponding values calculated by a replacement cost estimation module of another cache.

9. The system of claim 1, wherein the computational costs and communication latencies determined for the plurality of cache entries are shared with another cache.

10. A method comprising:
    receiving, by a network device, a request from a client device for data;
    determining, by a cache management system running on the network device, for each of a plurality of cache entries of a cache managed by the cache management system, a communication latency between the cache and respective origin storage devices by probing the respective origin storage devices;
    determining, by the cache management system, for each cache entry of the plurality of cache entries, a computational cost of reproducing cached data within the cache entry by the respective origin storage devices from which the cached data originated by measuring a time difference between a request for the data cached issued to a respective origin storage device and corresponding response received from the respective origin storage device and subtracting from the time difference a corresponding communication latency of the communication latencies; and enabling, by the cache management system, the cache to replace the cached data within a selected cache entry of the plurality of cache entries with the requested data based on the computational cost.

11. The method of claim 10, further comprising determining times that the cache would take to recreate a cache entry for respective cached data within each of the plurality of cache entries; and enabling the cache to replace cached data within an outgoing cache entry of the plurality of cache entries with the requested data based on the times.

12. The method of claim 11, wherein the computational cost associated with the outgoing cache entry is lower than respective computational costs associated with all other cache entries of the plurality of cache entries.

13. The method of claim 10, wherein the cache comprises any or a combination of a network cache, a Hypertext Transfer Protocol (HTTP) cache of an Application Delivery Controller (ADC) and a standalone cache.

14. The method of claim 10, wherein the cache comprises a network cache, and wherein at least one of the respective origin storage devices comprises a server from which the respective cached data originated.

15. The method of claim 10, further comprising selecting, by the by the cache management system, the selected cache entry based at least in part on any or a combination of a size of the requested data, a least frequently used cache entry of the plurality of cache entries, a size of the respective cached data stored within the plurality of cache entries, a number of times the respective cached data has been accessed or previously cached, and relative timing of caching of the respective cached data.

16. The method of claim 10, wherein the computational costs and the communication latencies determined for the plurality of cache entries are considered by the cache management system when a size of the cached data within the selected cache entry is greater than a predefined or configurable threshold.

17. The method of claim 10, wherein the computational costs and communication latencies determined for the plurality of cache entries are updated with corresponding values calculated by a cache management system of another network device.

18. The method of claim 10, wherein the computational costs and communication latencies determined for the plurality of cache entries are shared with a cache management system of another network device.

* * * * *